Sept. 15, 1953  O. K. KELLEY ET AL  2,651,918
ROTARY HYDRAULIC TORQUE CONVERTER WITH DYNAMIC BRAKING
Filed July 30, 1949  2 Sheets-Sheet 2

Inventors
Oliver K. Kelley &
William S. Wolfram
By
Spencer, Willits, Helmig & Baillie
Attorneys Patented Sept. 15, 1953

2,651,918

UNITED STATES PATENT OFFICE 2,651,918

ROTARY HYDRAULIC TORQUE CONVERTER WITH DYNAMIC BRAKING

Oliver K. Kelley, Birmingham, and William S. Wolfram, Walled Lake, Mich., assignors to General Motors Corporation, Detroit, Mich., a corporation of Delaware Application July 30, 1949, Serial No. 107,764

14 Claims. (Cl. 60—54)

The present invention relates to kinetic energy type torque-transmitting systems. More particularly it relates to providing means for the transmission of torque from the normally driven member to the normally driving member in a kinetic energy type torque-transmitting mechanism.

Torque converters are designed so as to provide an efficient transfer of torque from the impeller member to the turbine member but contain little provision for the transmission of torque in a reverse direction. It is sometimes necessary to provide a means for the transmission of torque from the normally driven to the normally driving member. For example, such a torque-transmitting characteristic is quite desirable to provide dynamic braking in automotive vehicles. Dynamic braking is quite desirable when the vehicle is operated in mountainous country. It is also desirable to provide a means for starting the engine by pushing the vehicle.

It is therefore an object of the present invention to include auxiliary elements in a conventional torque converter and thereby provide a means for the transmission of torque from the normally driven to the normally driving member under overrunning conditions.

It is a further object of the present invention to prevent the stalling of internal combustion engines used with torque converters by providing within the torque converter a fluid circuit capable of transmitting torque to the engine from the normally driven member.

It is a further object of the present invention to provide impeller and turbine vanes in the eye of a torque converter torus on the turbine and impeller members respectively to give driving torque from the turbine to the impeller under conditions where the angular velocity of the turbine is greater than that of the impeller.

Referring to the figures in the drawings.

Figure 1:
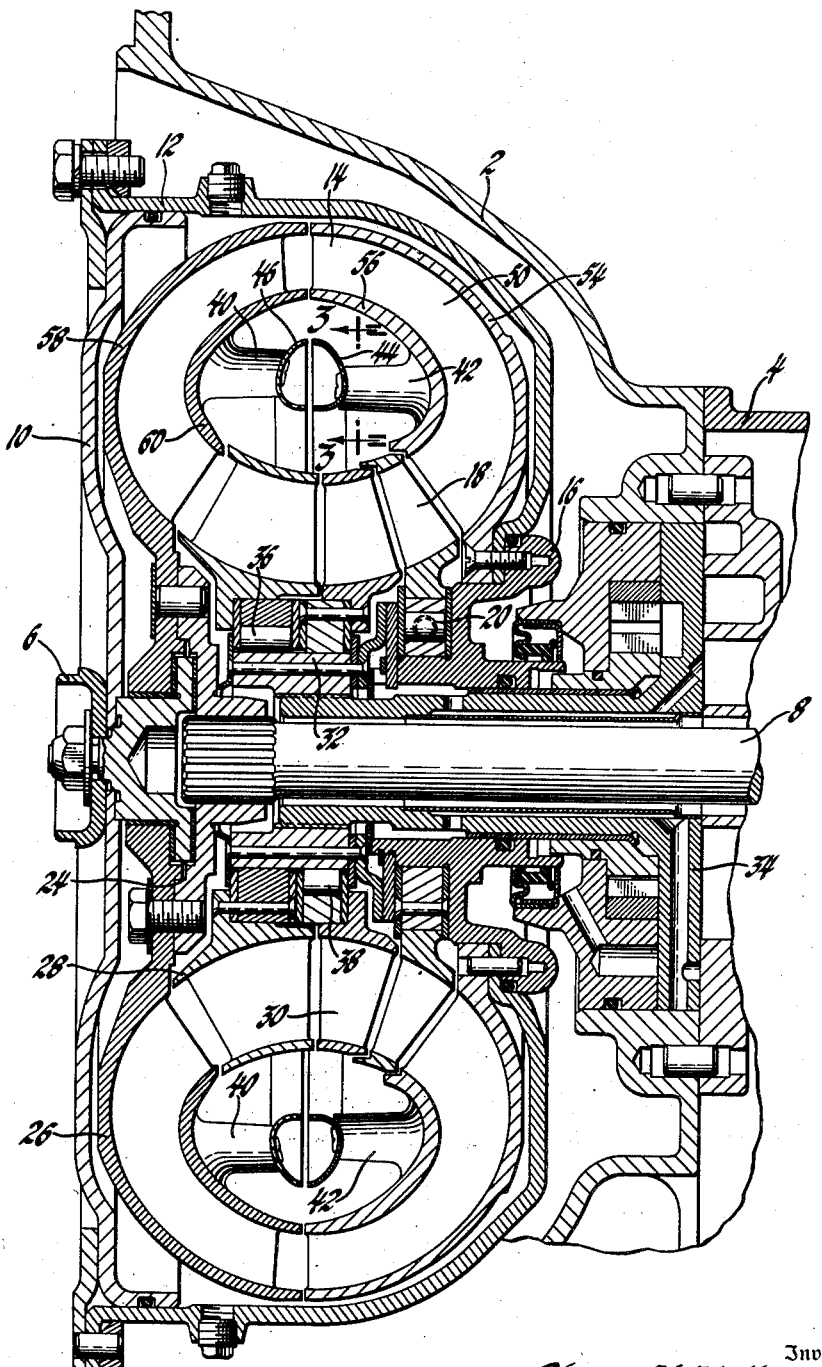
Figure 1 is a sectional view through a torque converter including the present invention.

Referring to Figure 1, a cross section of a torque converter of the general type disclosed in application for Letters Patent S. N. 790,950 for "Multiple Stage Torque Converter Drive," filed December 11, 1947, and application for Letters Patent S. N. 83,618 for "Multi-Range Converter Drive," filed March 26, 1949, both filed by Oliver K. Kelley, one of the present inventors, is illustrated. The present torque converter however differs from these prior disclosures in certain important respects. The difference in which we are here concerned resides in the use of auxiliary impeller and turbine vanes in the eye of the torque converter to permit the transmission of torque from the normally driven to the normally driving member.

In Figure 1, 2 is the casing of a torque converter. It is attached to the frame of the vehicle in a suitable manner. This casing acts as a supporting frame for the torque converter and a reaction point for the reactor blades and is attached to the casing 4 of the change speed transmission located adjacent thereto. The torque is normally introduced into the torque converter through the member 6 and is transmitted from the torque converter to the change speed gears by shaft 8. The engine crankshaft is attached to the member 6 by suitable means. The member 6 is rigidly attached to the plate 10. The plate 10 is bolted to the drum 12 which, together with this plate, acts as a fluid tight container for the converter unit. The drum 12 is rigidly attached by means of screws and dowel pins to the impeller 14. The impeller is therefore driven directly from the crankshaft of the engine. This impeller 14 is carried by hub member 16. A second impeller 18 is carried by the hub 16 by means of overrunning clutch 20. This second impeller is thereby permitted to rotate at a speed faster than the impeller 14 but may not rotate at a lower speed than this impeller 14.

The drum 12 and hence the entire fluid circuit for the torque converter is maintained under suitable hydraulic pressure during operation. This pressure is maintained by suitable hydraulic pumps and pressure relief valves.

The impeller 14 is shaped in the form of a segment of a toroid having vanes suitably positioned therein for introducing kinetic energy into the torque converter fluid. The driven shaft 8 has splined thereon by means of hub 24 a turbine member 26. This turbine member 26 is also in the shape of a segment of a toroid. Kinetic energy is introduced into the hydraulic fluid by the impeller 14 and this kinetic energy is transmitted to the turbine member 26.

In order to change the direction of flow of the fluid and thereby permit its entry into the impeller member at a more advantageous angle, overrunning stator members 28 and 30 are provided. These two stator members are mounted on a hub 32 which in turn is splined to reaction member 34 which reaction member is anchored to the casing 2. These reaction vanes 28 and 30 are in the shape of small segments of a toroid and have suitably shaped vanes therein to change the direction of travel of the fluid as necessary. They are mounted on the hub 32 by means of overrunning clutches 36 and 38 respectively so that they may travel in the same direction as do the members 14 and 26 but may not travel in the reverse direction. This permits the torque converter to operate substantially as a fluid coupling under certain conditions of operation as is more fully described in the above two mentioned applications. The present construction is novel over that claimed in the above applications in that it provides auxiliary impeller vanes 40 rigidly attached to the turbine 26 and auxiliary turbine vanes 42 rigidly attached to the impeller 14. These vanes together with the semi-toroidal members 44 and 46 to which they are rigidly attached form an auxiliary or secondary fluid circuit within the eye of the primary fluid circuit. The construction of these vanes and their general arrangement is more particularly shown with reference to Figures 2 and 3.

Figure 2:
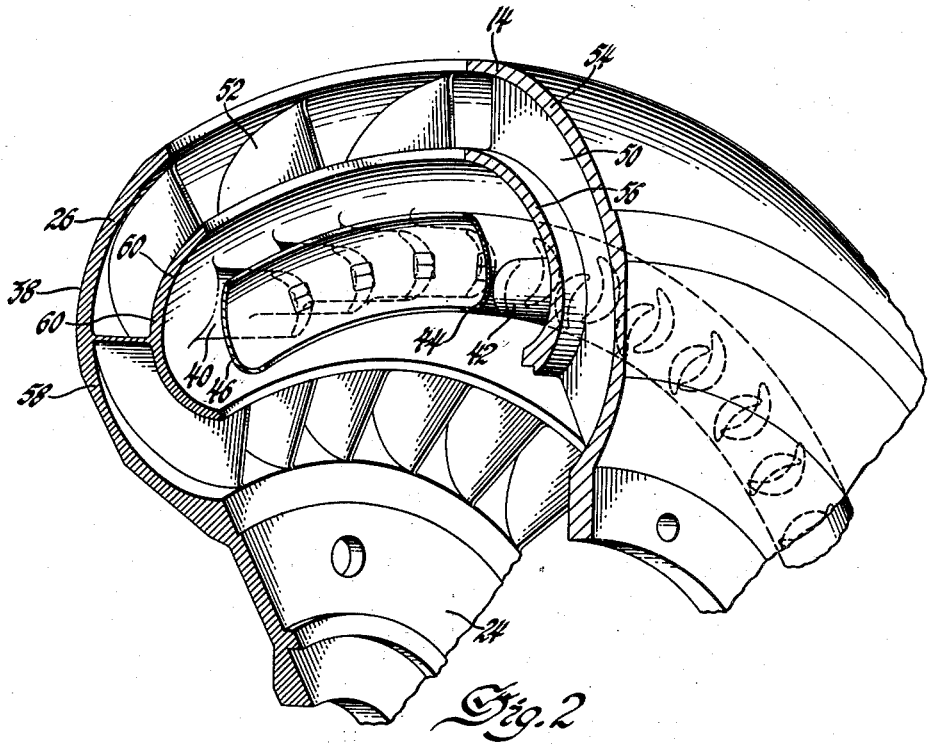
Figure 2 is a partial perspective sectional view showing the arrangement of the auxiliary elements.

Referring to Figure 2, a partial sectional perspective view of the torque converter impeller and turbine elements and their general arrangement is illustrated. It will be noted that the impeller 14 has blades 50 therein and the turbine 26 has blades 52 therein. The impeller 14 has an outer shell 54 and an inner shell 56 and the turbine 26 has an outer shell 58 and an inner shell 60. These shells together with the blades or vanes 50 and 52 in the impeller and turbine members respectively, provide a primary fluid flow path for the transmission of torque from the impeller 14 to the turbine 26.

Torque converters having this type of fluid system have been built and operated successfully in a large number of motor vehicles. These torque converters are however substantially one-way torque-transmitting devices and do not normally provide means for the transmission of torque from the wheels of the vehicle to the engine. It is quite desirable to provide the transmission of torque from the wheels to the engine to give dynamic braking and also to prevent engine stalling during deceleration. It is also sometimes desirable to start the engine of the automobile by pushing the vehicle. In vehicles utilizing the present torque converter, sufficient torque is transmitted from the wheels to the engine to cause rotation of the engine in starting, to provide dynamic braking, and to prevent stalling. In order to provide torque from the normally driven turbine 26 to the normally driving impeller 14 under conditions when the turbine 26 is rotating at a higher speed than the impeller 14, we have provided an auxiliary fluid circuit consisting of turbine vanes 42 and impeller vanes 40 attached in the eye of the primary fluid system to the impeller member 14 and turbine member 26 respectively. The vanes 40 and 42 are attached to inner shell members 46 and 44 respectively. The vanes, together with the semi-toroidal members 46 and 60, form an auxiliary impeller which is driven by the shaft 8 with the main turbine 26. These vanes are curved having a concave surface in the direction of rotation and a convex surface on their opposite sides. They are located just outside the center of the torus.

The vanes 42 together with the semi-toroidal members 44 and 56, form an auxiliary turbine element which receives kinetic energy from the fluid in the auxiliary fluid circuit or eye of the main torque converter and transmits this energy to the impeller element 14 and hence back to the engine through the member 6 thus allowing the engine to be driven by the shaft 8 through this auxiliary fluid coupling. These vanes 42 have convex surfaces in the direction of rotation or leading side and concave surfaces on their opposite side.

Figure 3:
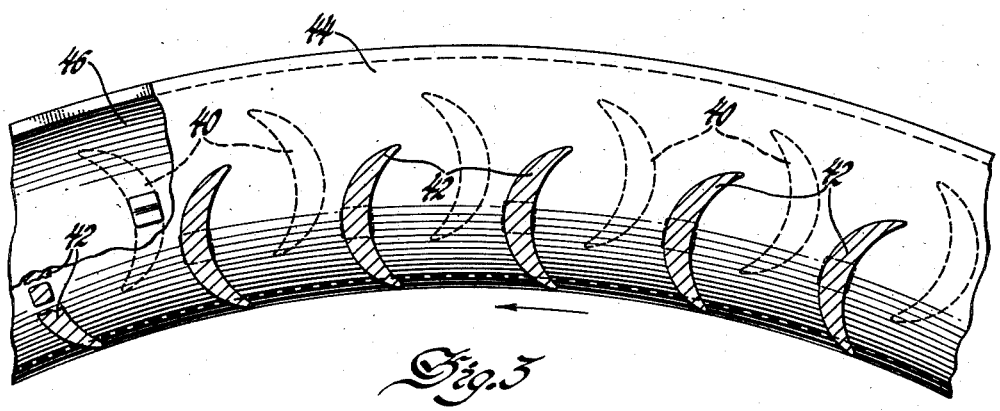
Figure 3 is a detailed view showing the shape and arrangement of the auxiliary elements, partly in section on the line 3—3 of Fig. 1.

Referring to Figure 3, the shape and arrangement of the auxiliary impeller elements 40 and the auxiliary turbine elements 42 is shown. It will be here noted that when the elements 40 are traveling faster than are the elements 42, the concave surfaces of these vanes approach each other and thus permit the maximum transfer of energy from the vanes 40 to the vanes 42. It will also be noted that the vanes 40 are located a greater distance from their center of rotation than are the vanes 42. This is to permit more efficient transfer of energy between the sets of vanes when the vanes 40 are traveling faster than the vanes 42. When the vanes 42 are traveling faster than the vanes 40, the convex surfaces of these two sets of vanes approach each other. Under these conditions there is a minimum of energy transfer from the vanes 42 to the vanes 40.

While greater transfer of energy from the vanes 42 to the vanes 40 would not be objectionable in itself, the vanes are so shaped as to have a maximum of transfer of energy from the vanes 40 to the vanes 42 and hence are made of the shape illustrated.

The vanes as here illustrated are cast integral with the primary elements. They may of course be of sheet metal construction and brazed, fastened with tabs or otherwise secured to the primary elements without departing from the scope of the present invention.

It is to be understood also that although the invention has been described with specific reference to a particular embodiment thereof, it is not to be so limited, since changes and alterations therein may be made which are within the full intended scope of this invention as defined by the appended claims.

We claim:

1. A kinetic energy type fluid torque-transmitting system including; an impeller member connected to a rotary source of energy, a turbine member connected to the mechanism to be driven, said impeller and turbine each including spaced shells forming a fluid circuit, a set of primary vanes on said impeller and a set of primary vanes on said turbine for transmitting energy from said impeller to said turbine, an additional shell carried by said impeller and an additional shell carried by said turbine, said additional shells forming with the adjacent turbine and impeller shells a second fluid circuit, a set of secondary vanes carried by said impeller and a set of secondary vanes carried by said turbine, all of said secondary vanes having concave and convex surfaces positioned in said second fluid circuit, the convex surfaces of the secondary vanes carried by said impeller facing the convex surfaces of the secondary vanes carried by said turbine, the convex surfaces of the secondary vanes carried by said impeller lying on the forward side thereof in the normal direction of rotation of said impeller such that minimum torque is transferred through said secondary vanes when said impeller over-runs said turbine and maximum torque is transmitted through said secondary vanes when said turbine over-runs said impeller.

2. A kinetic energy type fluid torque-transmitting system including; a toroidal section shaped impeller member connected to a rotating source of energy, a mating toroidal section shaped turbine member connected to a rotatable mechanism to be driven, a toroidal fluid system including said impeller and said turbine with an eye therein having two mating semi-toroidal members, one of said semi-toroidal members being attached to said impeller member by means of vanes having convex and concave surfaces normal to the direction of rotation of said impeller, the convex surface of said vanes being on the forward side thereof in the normal direction of rotation of said impeller, the second of said semi-toroidal members attached to said turbine member by means of vanes having convex and concave surfaces normal to the direction of rotation of said turbine, the concave surface of said vane lying on the forward side thereof in the normal direction of rotation of said turbine so that when the speed of the impeller is greater than the speed of said turbine the convex surfaces of said two sets of vanes in the eye of said toroidal system approach each other and that when the speed of said turbine is greater than the speed of said impeller the concave surfaces of said sets of vanes approach each other, thereby causing a minimum of torque transmission through said convex-concave vanes when the impeller is overrunning the turbine and a maximum of torque transmission through said convex-concave vanes when said turbine is overrunning said impeller.

3. A kinetic energy type fluid torque transmitting mechanism including a toroidal shaped primary torque transmitting system and a secondary toroidal shaped torque transmitting system, said primary system including an impeller and a turbine member formed of spaced outer and inner shells providing a path for working fluid, a pair of semi-toroidal shells forming with the inner shells of said primary system a second path for working fluid, a secondary impeller including vanes having concave and convex surfaces carried by said primary turbine member, a secondary turbine including vanes having concave and convex surfaces carried by said primary impeller, all of said vanes being disposed in said second path, the convex surfaces of said secondary turbine vanes constituting the leading surface of said secondary turbine vanes in their path of travel, to transmit a greater magnitude of torque when said primary turbine is overrunning said primary impeller than when said primary impeller is overrunning said primary turbine.

4. A kinetic energy type fluid torque transmitting mechanism including a toroidal shaped primary torque transmitting system and a toroidal shaped secondary torque transmitting system, said primary system including an impeller and a turbine member with inner and outer shells providing a path of travel for working fluid, a pair of semi-toroidal shells forming with the inner shells of said primary system a second path of travel for working fluid, both of said working fluid paths being flooded simultaneously with working fluid, a set of vanes having concave and convex surfaces carried by said primary impeller member, a set of vanes having convex and concave surfaces carried by said primary turbine member, said first-mentioned set of vanes having the convex surfaces thereof disposed in said second-mentioned path of travel and positioned to form the leading surface of said vanes when said primary impeller is effective to drive said primary turbine member.

5. In a kinetic energy type fluid torque-transmitting mechanism, a toroidal shaped primary torque-transmitting mechanism composed of inner and outer shell members forming an impeller element and a turbine element, a set of vanes on the impeller and turbine elements, respectively, said shell members forming a primary path of travel for working fluid, a toroidal shaped secondary torque-transmitting mechanism located in the eye of said primary toroidal mechanism, a pair of shell members in said secondary system forming with the inner shell members of said primary torque-transmitting mechanism a second fluid path for working fluid, a secondary set of vanes having concave and convex surfaces carried by said primary impeller member supporting one of said secondary shell members, a secondary set of vanes having concave and convex surfaces carried by said primary turbine member and supporting the other of said secondary shell members, the secondary vanes carried by said primary impeller having the convex surface thereof lying on the forward side thereof in the direction of rotation of said primary impeller to present minimum resistance to flow of working fluid in said second fluid path when said primary impeller is driving said primary turbine member, and the secondary vanes carried by said primary turbine member being positioned in said second fluid path with the concave surface thereof lying on the forward side thereof in the normal direction of rotation of said turbine.

6. In a kinetic type fluid torque-transmitting mechanism, a toroidal shaped primary torque-transmitting system and a toroidal shaped secondary torque-transmitting system located in the eye of said primary toroidal system, said primary system including an impeller member and a turbine member, each of said members being formed of spaced outer and inner shells forming a path of travel for working fluid therebetween, a set of primary vanes carried by each of said members and disposed in said path of travel, said secondary system including a pair of shells spaced from the inner shells of said primary system and forming therewith a second path of travel for working fluid, a set of secondary vanes carried by said primary system impeller and disposed in said second-mentioned path of travel, a set of secondary vanes carried by said primary system turbine and disposed in said second-mentioned path of travel, said secondary vanes having oppositely facing concave and convex surfaces, the convex surfaces of the secondary vanes carried by said primary impeller lying on the forward side thereof in the normal direction of rotation of said primary impeller.

7. A kinetic energy type fluid torque-transmitting system including a primary impeller member connected to a rotating source of energy, a primary turbine member connected to the mechanism to be driven, said members being formed of spaced outer and inner shells forming a path of travel for working fluid, a set of primary vanes on said impeller and on said turbine members, respectively, extending into said path for transferring energy from said impeller to said turbine member, a pair of semi-toroidal shells spaced radially inwardly from the inner shells of said primary impeller and turbine and forming therewith a second path of travel for working fluid, a secondary set of vanes having concave and convex surfaces carried by said primary impeller member extending normal to the path of travel of said impeller member, a secondary set of vanes having concave and convex surfaces carried by said primary turbine member extending normal to the path of travel of said turbine member, all of said secondary vanes being disposed in said second path of travel of working fluid, the secondary vanes carried by said primary impeller being disposed with the convex surfaces thereof facing the normal direction of rotation of said primary impeller, and the secondary vanes carried by said primary turbine having the concave surfaces thereof facing the normal direction of rotation of said turbine.

8. An anti-stall apparatus for an internal combustion engine driving a load through a torque converter including primary turbine and impeller members having outer and inner members forming a path of travel for working fluid, vanes carried by said members for transmitting torque from said impeller to said turbine member, a secondary torque-transmitting mechanism including a semi-toroidal shell member carried by said primary impeller and a semi-toroidal shell member carried by said primary turbine member, said members forming with the inner members of said primary turbine and impeller members a second path of travel for working fluid, a set of secondary vanes having concave and convex surfaces extending between the inner member of said primary impeller and one of said semi-toroidal shell members, a set of secondary vanes extending between the inner member of said primary turbine and the other of said semi-toroidal shell members, said secondary vanes having concave and convex surfaces extending normal to their axes of rotation, the concave surfaces of one of said sets of secondary vanes being positioned to approach the concave surfaces of the other of said sets of secondary vanes when the primary turbine member overruns the primary impeller member.

9. A torque transmitting system including a primary impeller and a primary turbine, said impeller and turbine each being formed of spaced outer and inner shells cooperating to form a primary fluid circuit, vanes carried by said impeller and turbine, respectively, for transmitting torque from said primary impeller to said primary turbine, an additional shell member carried by said primary impeller, an additional shell member carried by said primary turbine, said shell members cooperating with each other and with one of the shell members of said primary impeller and turbine, respectively, to form a secondary fluid circuit, and additional secondary vanes carried by said primary impeller and turbine, respectively, disposed in said secondary fluid circuit normal to the direction of rotation of said impeller and turbine, respectively, said secondary vanes having convex and concave surfaces, the convex surface of the secondary vanes carried by said primary impeller lying on the forward side thereof in the normal direction of rotation of said impeller and positioned with respect to the convex surfaces of the secondary vanes carried by the turbine such that minimum torque is transferred through said secondary vanes when said impeller overruns said turbine and maximum torque is transferred through said secondary vanes when said turbine overruns said impeller.

10. A torque transmitting system including a primary impeller and a primary turbine, said impeller and turbine each being formed of spaced outer and inner shells cooperating to form a primary fluid circuit, vanes supported upon said shells for transmitting torque from said primary impeller to said primary turbine, all of said vanes being positioned in said primary fluid circuit, an additional shell member disposed radially inwardly from the inner shell of said primary impeller and carried by said primary impeller, an additional shell member disposed radially inwardly from the inner shell of said primary turbine member and carried by said primary turbine member, said additional shell members cooperating with the inner shells of said primary impeller and primary turbine, respectively, and with each other to form a secondary fluid circuit, both of said fluid circuits being flooded simultaneously with working fluid, a secondary set of vanes carried by said primary impeller disposed in said secondary fluid circuit, and a secondary set of vanes carried by said primary turbine disposed in said secondary fluid circuit both of said secondary sets of vanes having convex and concave surfaces, the convex surface of said vanes carried by said primary impeller lying on the forward side thereof in the normal direction of rotation of said impeller, and the concave surface of said vanes carried by said primary turbine lying on the forward side thereof in the normal direction of rotation of said turbine.

11. A torque transmitting system including a primary impeller and a primary turbine, said impeller and turbine each being formed of spaced outer and inner shells cooperating to form a primary circuit for working fluid, primary vanes carried by said impeller and turbine, respectively, disposed in said primary working fluid circuit for transmitting torque from said primary impeller to said primary turbine, an additional shell member carried by said primary impeller, an additional shell member carried by said primary turbine, said additional shell members being disposed radially inwardly from the inner shells of said primary impeller and turbine members, respectively, and cooperating with said last-mentioned shell members and with each other to form a second path of travel for working fluid, both of said paths of travel being flooded simultaneously with working fluid, a secondary set of vanes carried by said primary impeller, and a secondary set of vanes carried by said primary turbine, both of said secondary sets of vanes being disposed in said second working fluid path, both of said secondary sets of vanes being formed of concave and convex surfaces and the convex surfaces of the secondary vanes carried by said primary impeller constituting the leading surface of said vanes in their path of travel.

12. A kinetic energy type torque transmitting mechanism including; a toroidal shaped primary torque transmitting system having a primary impeller and a primary turbine, primary vanes on said impeller and turbine, respectively, and a toroidal shaped secondary torque transmitting system located in the eye of said primary torque transmitting system, each of said systems including members forming a path for working fluid and each of said systems being flooded simultaneously with working fluid, a set of secondary vanes having convex and concave surfaces supported upon said primary impeller, a set of secondary vanes having concave and convex surfaces supported upon said primary turbine, the convex surfaces of the secondary vanes carried by said primary impeller being positioned on the forward side thereof in the normal direction of rotation of said primary impeller and facing the convex surfaces of the secondary vanes carried by said primary turbine such that torque transfer through said secondary torque transmitting system is minimum when said primary impeller overruns said primary turbine and is maximum when said primary turbine overruns said primary impeller.

13. A torque transmitting system including primary turbine and impeller members forming a path of travel for working fluid, primary vanes carried by said members, respectively, for transmitting torque from said impeller to said turbine member, a secondary torque transmitting mechanism including spaced members forming a second path of travel for working fluid, a set of secondary vanes carried by said primary impeller having concave and convex surfaces extending transverse to said second path of travel, an additional set of secondary vanes carried by said primary turbine having concave and convex surfaces extending transverse to said second path of travel and disposed in a different plane than that of said first-mentioned set of secondary vanes, the convex surfaces of one of said sets of secondary vanes being positioned to constitute the leading surface of said vanes in their direction of rotation and the concave surfaces of said other set of secondary vanes constituting the leading surface of said vanes in their direction of rotation such that minimum torque is transmitted through said secondary vanes when said primary impeller overruns said primary turbine and maximum torque is transmitted through said secondary vanes when said primary turbine overruns said primary impeller.

14. A kinetic energy type torque transmitting system including; a primary impeller, a primary turbine, primary vanes carried by said impeller and turbine, respectively, said impeller and turbine forming a first path for flow of working fluid, mechanism forming a second path for flow of working fluid, a set of secondary vanes carried by said primary impeller in said second fluid flow path having convex and concave surfaces and extending normal to the direction of rotation of said impeller, a second set of secondary vanes carried by said primary turbine in said second fluid flow path having convex and concave surfaces and extending normal to the direction of rotation of said turbine, both of said fluid flow paths being flooded simultaneously with working fluid, the convex surface of said first-mentioned set of secondary vanes lying on the forward side thereof in the normal direction of rotation of said impeller, and the concave surface of said second-mentioned secondary vanes lying on the forward side thereof in the normal direction of rotation of said turbine such that minimum torque is transferred through said secondary vanes when said primary impeller overruns said primary turbine and maximum torque is transferred through said secondary vanes when said primary turbine overruns said primary impeller.

OLIVER K. KELLEY.
WILLIAM S. WOLFRAM.

References Cited in the file of this patent

UNITED STATES PATENTS

| Number | Name | Date |
| --- | --- | --- |
| 1,199,360 | Föttinger | Sept. 26, 1916 |
| 1,904,054 | Kiep et al. | Apr. 18, 1933 |
| 1,972,175 | Vessey | Sept. 4, 1934 |